US012647192B2

(12) United States Patent (10) Patent No.: US 12,647,192 B2

Chau et al. (45) Date of Patent: Jun. 2, 2026

(54) RADIO FREQUENCY ENCLOSURE ATTENUATION CALIBRATION

(71) Applicant: T-Mobile USA, Inc., Bellevue, WA (US)

(72) Inventors: Johnson Chau, Seattle, WA (US); Andrew Nelson, Yakima, WA (US); Ryan Christopher Lindstrom, De Soto, KS (US); Grant Edward Taylor, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 435 days.

(21) Appl. No.: 18/476,047

(22) Filed: Sep. 27, 2023

(65) Prior Publication Data

US 2025/0105932 A1 Mar. 27, 2025

(51) Int. Cl.
*H04B 17/318* (2015.01)
*H04W 36/36* (2009.01)

(52) U.S. Cl.
CPC ........ *H04B 17/328* (2023.05); *H04W 36/362* (2023.05)

(58) Field of Classification Search
CPC .... H04B 17/328; H04B 17/21; H04W 36/362
See application file for complete search history.

(56) References Cited

U.S. PATENT DOCUMENTS 6,885,348 B1 * 4/2005 Ryken, Jr. ............ G01R 29/105
343/703
7,933,559 B2 * 4/2011 Stojcevic ............. G01R 29/105
340/552

9,742,508 B1 * 8/2017 Kyosti .................. H04B 17/12
2012/0221277 A1 * 8/2012 Gregg ................... H04B 17/11
702/106
2013/0303089 A1 * 11/2013 Wang ................... H04W 24/06
455/67.12

(Continued)

FOREIGN PATENT DOCUMENTS

WO WO2020168127 A1 8/2020

OTHER PUBLICATIONS

Search Report for European Application No. 24200475.2, Dated Feb. 18, 2025, 10 pages.

*Primary Examiner* — Edan Orgad
*Assistant Examiner* — Malick A Sohrab
(74) *Attorney, Agent, or Firm* — Lee & Hayes, P.C.

(57) ABSTRACT

Techniques for determining calibration data associated with a radio frequency (RF) testing environment are discussed herein. For example, an RF signal can be input to the RF enclosure and selectively applied to discrete attenuators. The attenuators can attenuate a strength of the signal and a signal strength can be measured by various user equipment (UEs) that are located within an RF enclosure. In some examples, a plurality of measured reference signal received power (RSRP) values can be determined by a plurality of UEs associated with a particular attenuation level. Different attenuation levels can be measured, and an average attenuation can be determined for attenuation steps. Measured attenuation steps can be extrapolated to other attenuation levels to expedite the calibration process. Then, a testing plan can be applied to the RF enclosure and the calibration data can be used to ensure accurate signals for testing UEs.

20 Claims, 6 Drawing Sheets

100

(56)         References Cited

U.S. PATENT DOCUMENTS

| | | | |
|---|---|---|---|
| 2015/0109941 A1* | 4/2015 | Zhang | H04W 24/06 |
| | | | 370/252 |
| 2019/0331718 A1* | 10/2019 | Cummings | H04B 17/382 |
| 2022/0132349 A1* | 4/2022 | Li | H04B 17/318 |
| 2024/0259975 A1* | 8/2024 | Lo | H04W 56/0045 |

* cited by examiner

COMPUTING DEVICE 300

CALIBRATION COMPONENT 320

PROCESSOR(S) 302

TESTING COMPONENT 322

REMOVABLE STORAGE 316

COMMUNICATION COMPONENT 324

NON-REMOVABLE STORAGE 318

DISPLAY COMPONENT 326

MEMORY COMPONENT 319

500

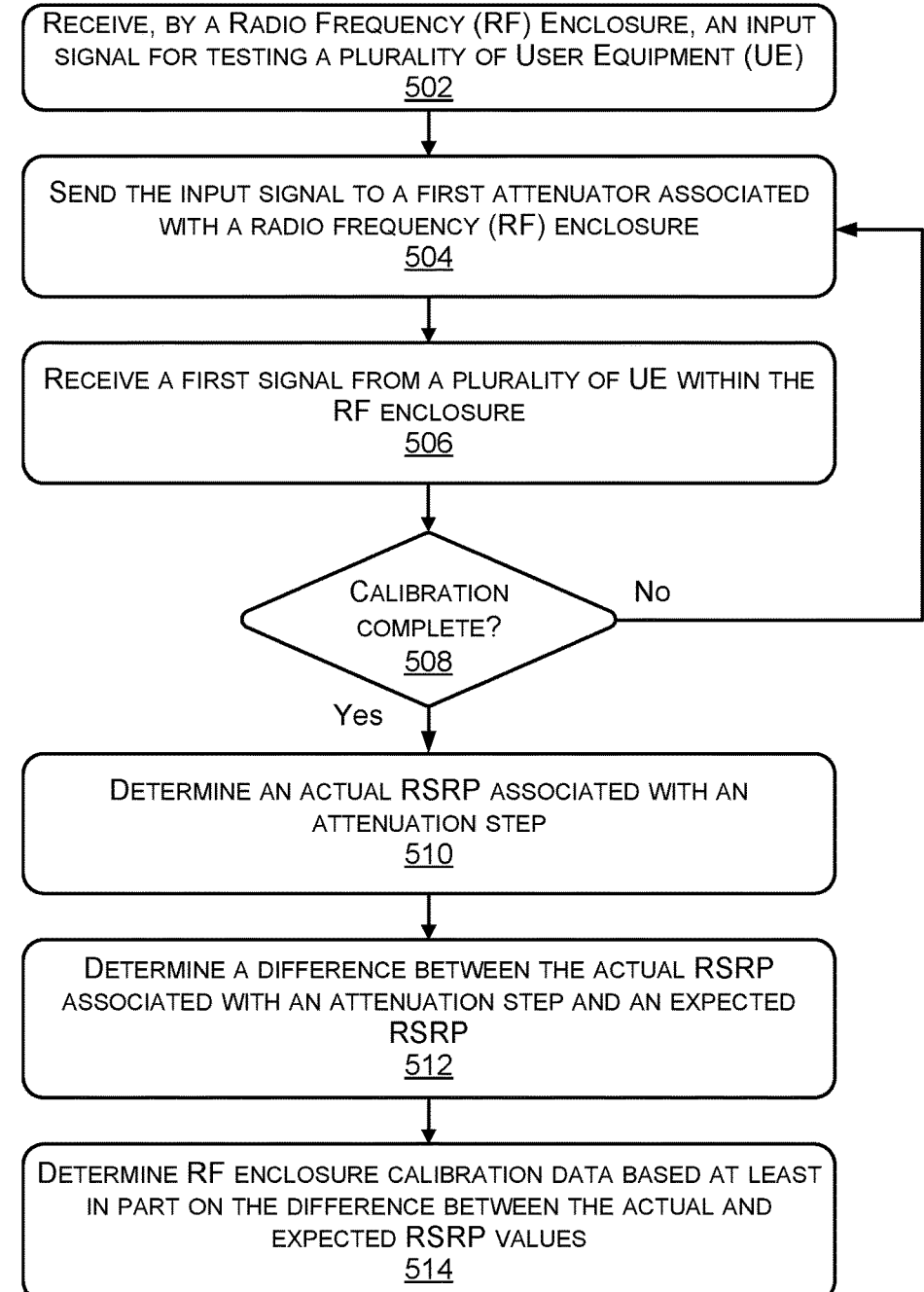

RECEIVE, BY A RADIO FREQUENCY (RF) ENCLOSURE, AN INPUT SIGNAL FOR TESTING A PLURALITY OF USER EQUIPMENT (UE)
502

SEND THE INPUT SIGNAL TO A FIRST ATTENUATOR ASSOCIATED WITH A RADIO FREQUENCY (RF) ENCLOSURE
504

RECEIVE A FIRST SIGNAL FROM A PLURALITY OF UE WITHIN THE RF ENCLOSURE
506

CALIBRATION COMPLETE?
508

No

Yes

DETERMINE AN ACTUAL RSRP ASSOCIATED WITH AN ATTENUATION STEP
510

DETERMINE A DIFFERENCE BETWEEN THE ACTUAL RSRP ASSOCIATED WITH AN ATTENUATION STEP AND AN EXPECTED RSRP
512

DETERMINE RF ENCLOSURE CALIBRATION DATA BASED AT LEAST IN PART ON THE DIFFERENCE BETWEEN THE ACTUAL AND EXPECTED RSRP VALUES
514

FIG. 5

RADIO FREQUENCY ENCLOSURE ATTENUATION CALIBRATION

BACKGROUND

Cellular communication devices, often referred to as mobile devices or user equipment (UE), communicate by wirelessly transmitting and receiving radio frequency (RF) signals. In general, the higher the signal strength or quality, the more effective their communication is, and the better the user experience. One parameter used to measure RF signal strength is Reference Signal Receive Power (RSRP), which represents the received power of the signals in a given cell network. RSRP values can be altered when attenuation, or loss of signal strength in network connections, occurs. This may be due to a number of factors, such as physical limitations of certain technologies or various environmental features, like as excessive radio noise or signal deflection. Different degrees of attenuation will result in differences in measurable RSRP values between different UEs. However, accurately testing UEs at different attenuation levels can be challenging.

Generally, a certain attenuation should give a certain RSRP value based on each discrete attenuation level and/or based on each discrete band. However, based on variations within a system, or where signals could bounce off or otherwise be distorted by the environment, there may be a disconnect between expected and actual RSRP values for a given attenuation at the test UE(s). This can make it difficult to accurately manipulate network connections to achieve the desired test scenario.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process for determining attenuation calibration data.

DETAILED DESCRIPTION

Figure 1:
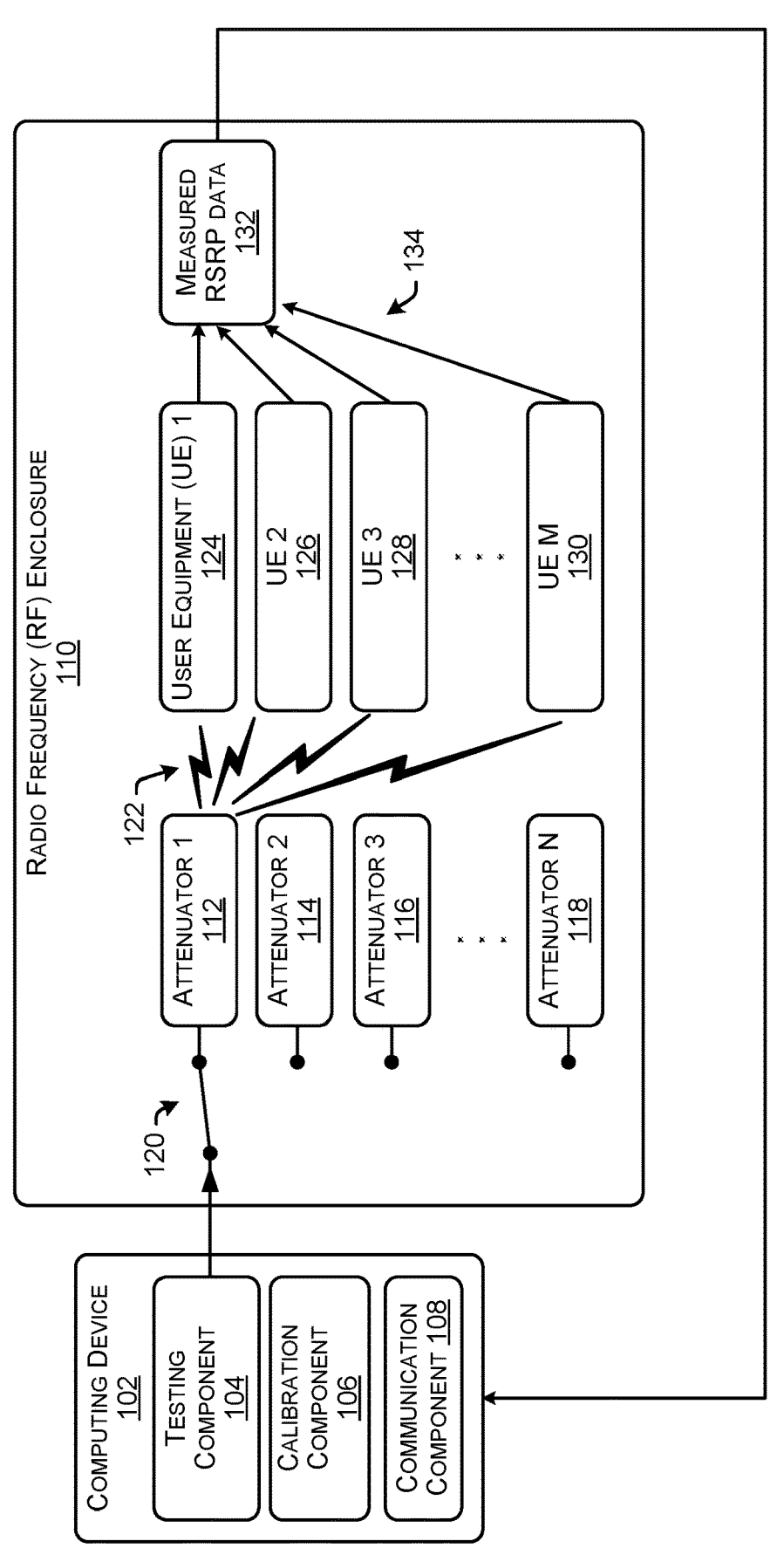
FIG. 1 shows an example system in which one or more user equipment (UE) within a test environment radio frequency (RF) enclosure can receive signals passed through different attenuators and then send the resulting measurement data out of the RF enclosure to be analyzed.

Techniques for determining calibration data associated with a radio frequency (RF) testing environment are discussed herein. For example, in order to measure signal strength during testing, one or more user equipment (UEs) may be located within an RF enclosure. In some examples, the RF enclosure may be a Faraday cage, or any other enclosed space which prevents input signals entering from outside of its own confines. An input signal may be sent by a computing device, or other radio source, to the UE in the RF enclosure. In some examples, the input signal may be a Long-Term Evolution (LTE) signal or a New Radio (NR) signal. The input signal may comprise or otherwise represent a number of frequency bands. For example, the input signal may be sent on frequency bands N41, N48, or B66. Of course, other frequency bands and/or radio access technologies (e.g., 3G, 4G, 5G, Wi-Fi, Bluetooth, NFC, etc.) may be used.

A RF enclosure may be used to perform repeatable testing of a device, such as a UE, and a radio as the UE operates on a high-level frequency band provided by the radio. During a testing protocol, a RF enclosure may initiate various operations of the UE and the radio by coupling the UE and the radio with a filter (e.g., one or more selectable attenuators) and causing the UE and the radio to perform operations. The operations in the testing protocol may include, without limitation, initiating voice calls, transmitting and receiving data (messages, videos, music, etc.), running applications, browsing the Internet, causing handovers between bands and/or 4G/5G technologies, and performing other operations. By initiating operations within the RF enclosure such as those described herein with respect to the testing protocol, the UE may be tested in a laboratory environment using an automated process and include quick cycle times, making the tests relatively inexpensive and repeatable. Results of the testing protocols may be analyzed to determine performance of the UE, which may be compared to threshold performance metrics or used for other purposes.

In some examples, the UE may be a mobile phone. For example, a UE may be a Samsung phone, an iPhone, or another cellular phone capable of receiving the input signal after it is passed through an attenuator. In some examples, the UE may be a tablet, laptop, watch, module, or other device with capable of sending or receiving any RF signals discuss herein. Furthermore, there may be multiple devices, with multiple signal carriers. In some examples, there may be at least one and up to five devices within a given RF enclosure (although any number of devices can be used). Additionally, there may be multiple RF enclosures, such that the user may have the option to select desired RF enclosures when testing. In some examples, different locations within each RF enclosure may distort signals received by the UE in different ways, resulting in different baseline RSRP value(s).

In some examples, the input signal may be attenuated by one or more attenuators located within the RF enclosure before being transmitted to the UE. In examples with multiple attenuators, each attenuator may be at discrete attenuation levels. Additionally, each attenuator may allow for 0 dB to 95 dB of attenuation (or any values) to the imposed on the input signal. In some examples, the UE can communicate with the computing device with regard to the measured signal strength post-attenuation. For example, the UE may contain software that pulls measured Reference Signal Receive Power (RSRP) values (e.g., measured in decibels (dB), directly from the UE before passing them to the computing device for analysis. In some examples, the measured RSRP values may be transmitted via an Android Debug Bridge (adb) contained on the UE. Various applications or other software installed on the UE may allow the user to interact with the UE in the RF enclosure, without opening the enclosure.

In some examples, the computing device may analyze measured RSRP values received from the UE. In some examples, this may take the form of selecting an attenuation level to test, dividing the selected attenuation level into a number of steps, and finding the average RSRP values for each step. In some examples, the attenuation level may be preset, as with an automated test, or the attenuation level may be manually selected by the user. In some examples, average RSRP values associated with earlier steps can be used to extrapolate expected RSRP values associated with later steps, removing the need to engage in further calculations. In some examples, the average actual RSRP values for earlier attenuation steps may then be used to extrapolate expected RSRP values for later attenuation steps. In some examples, the average RSRP value associated with each individual step in a selected attenuation level may be found by including only those values within a certain range of a pre-determined median RSRP value, with values outside of the range of the pre-determined median RSRP value being discarded. In some examples, if the measured RSRP values received by the computing device fall below a certain threshold, further measurements will be halted. For example, if a measured RSRP value falls below −130 dB (or some other value), further calculations may be halted, and an average RSRP value may be calculated from existing measurements. For example, and in general a determined RSRP value may be calculated or otherwise determined by taking some or all of the measured RSRP values, finding the differences between each step, sorting those differences in an ordered list, and selecting the median number to increment each for each successive attenuation step. Additional details of determining an RSRP value for attenuation steps is discussed throughout this disclosure.

In some examples, any average measured RSRP values may be recalculated or determined for one configuration of RF enclosures, attenuators, and UEs during each new use or over a period of time, providing updated data that may more accurately reflect measuring conditions in each test run. For example, after average measured RSRP values for one configuration are found, that same configuration may be tested again, on a regular basis to ensure the continued accuracy of the RSRP values calculated. In some examples, this retesting may occur on a daily basis, a weekly basis, a monthly basis, and the like. In some examples, calculations to find average measured RSRP values may be done for each new configuration of RF enclosures, attenuators, and/or UEs being tested.

In some examples, the processes above may be carried out for the purposes of analyzing the operation of a particular UE when carrying out various cellular functions. For example, average measured RSRP values may be obtained from tests mimicking static calls, handovers, speed tests, or speed tests with handovers. For example, a user may engage in handover testing of a device starting at frequency band B66 with a measured RSRP of −95 dB, expecting to handover to frequency band N41. Then, the user may decrease the RSRP value of B66 in increments of −5 dB, mapping to each attenuator until reaching a pre-determined termination condition at N41. In some examples, there may be 10 or more steps in each attenuation range. The calibration data discussed herein can be used during a testing plan to map expected RSRP values (according to the testing plan) to select discrete attenuators within the RF enclosure to ensure the intended RSRP values are generated within the RF enclosure to test the plurality of UEs.

In some examples, the techniques discussed herein can provide improvements to the functioning of computers in a network. For example, the techniques discussed herein can provide for improved calibration data to ensure that intended testing conditions are actually experienced by a UE. By using the calibration data discussed herein, testing procedures can be standardized and greater testing certainty can be gained. Further, more accurate calibration data can allow engineers to observe and have confidence that small changes are a result of hardware and/or software changes rather than just variability between tests. Improved testing can lead to optimized performance of UEs such as making or receiving calls, and can lead to a reduction in dropped calls or other negative behavior. By determining calibration data and initiating operations using the calibration data as described herein, UEs may be tested in a laboratory environment (e.g., with minimal interference from reflected radio signals and/or from external devices) using an automated process and include quick cycle times, improving efficiency and repeatability. Results of the testing protocols may be captured and analyzed to determine performance of the UE and/or the radio, which may be compared to threshold performance metrics or used for other purposes. Additional improvements are discussed throughout this disclosure.

The techniques discussed herein can be implemented in the context of protocols associated with one or more of 3G, 4G, 4G LTE, 5G, Wi-Fi, Bluetooth, and/or NFC protocols. In some examples, the network implementations can support standalone architectures, non-standalone architectures, dual connectivity, carrier aggregation, etc. Example implementations are provided below with reference to the following figures.

FIG. 1 shows an example system in which one or more user equipment (UE) within a test environment radio frequency (RF) enclosure can receive signals passed through different attenuators and then send the resulting measurement data out of the RF enclosure to be analyzed.

The example system 100 may include a computing device 102 that may include a testing component 104, a calibration component 106, and/or a communication component 108. The computing device 102 can generate testing signals that can be input to a radio frequency (RF) enclosure 110. The RF enclosure 110 can include an attenuator 1 112, an attenuator 2 114, and attenuator 3 116, and an attenuator N 118. The testing component 104 can select a particular attenuator using a switch 120. When the input signal is sent to the selected attenuator (e.g., illustrated as the attenuator 1 112), the selected attenuator may transmit the signal (illustrated as a signal 122) to one or more user equipment (UEs) 124, 126, 128, and 130 within the RF enclosure 110 (e.g., via a base station or an antenna). The Ues 124-130 can receive the signals 122 and then can measure the reference signal received power (RSRP) and can send the resulting measured RSRP data 132 out of the RF enclosure to be analyzed by a computing device 102.

In some examples, the UEs 124-130 can measure the RSRP and can provide the data via a wired or wireless connection 134 within the enclosure to ultimately be received by the computing device 102.

In some examples, the computing device 102 can include various components, such as the testing component 104, the calibration component 106, and/or the communication component 108. As will be discussed throughout this disclosure, the testing component 104 can initiate, halt, or otherwise manage the functions of the calibration component 106 and the communication component 108. And as further discussed herein, the exact functions of the testing component may vary depending on the degree of automation of the test selected. For example, users may be provided with the ability to select various bands and various RSRP values they want to see in their test scenarios. From there, the computing device 102 may control the switch 120 to select various attenuators to attenuate to those bands and match the RSRP values the user inputted with their corresponding attenuation values. In some examples, the testing component 104 can control the switch 120 to select the discrete attenuators 112, 114, 116, and/or 118 according to a testing plan.

In some examples, the calibration component 106 can measure, evaluate, calculate, or otherwise determine various RSRP values associated with the selected attenuation level. In some examples, the calibration component 106 can determine to prevent the inclusion of RSRP values below a pre-determined threshold, as well as exclude certain RSRP values not included in average calculations. The communication component 108 can send an input signal to the attenuators 112, 114, 116, and/or 120 contained within the RF enclosure 110, as well as receive measured RSRP data 132. In some examples, there may be multiple computing devices, such that a computing device sending the input signal may not necessarily be the same device that receives the measured RSRP data 132.

In some examples, the attenuators 112, 114, 116, and 118 may be fixed attenuators, step attenuators, or variable attenuators. In some examples, each attenuator may allow for 0 dB to 95 dB of attenuation to the imposed on the input signal 402, although any attenuation levels can be used.

In some examples, UEs 124, 126, 128, and 130 may include any device able to wirelessly connect to a telecommunication network to engage in communication sessions for voice calls, video calls, messaging, data transfers, and/or any other type of communication, including communications with the computing device 102. In some examples, UEs 124, 126, 128, and 130 may display or otherwise communication measured RSRP values in real time, enabling real-time evaluation of whether or not a test may need to be rerun. The number of UEs can, but is not required to, match the number of attenuators present in a selected RF enclosure.

Figure 2:
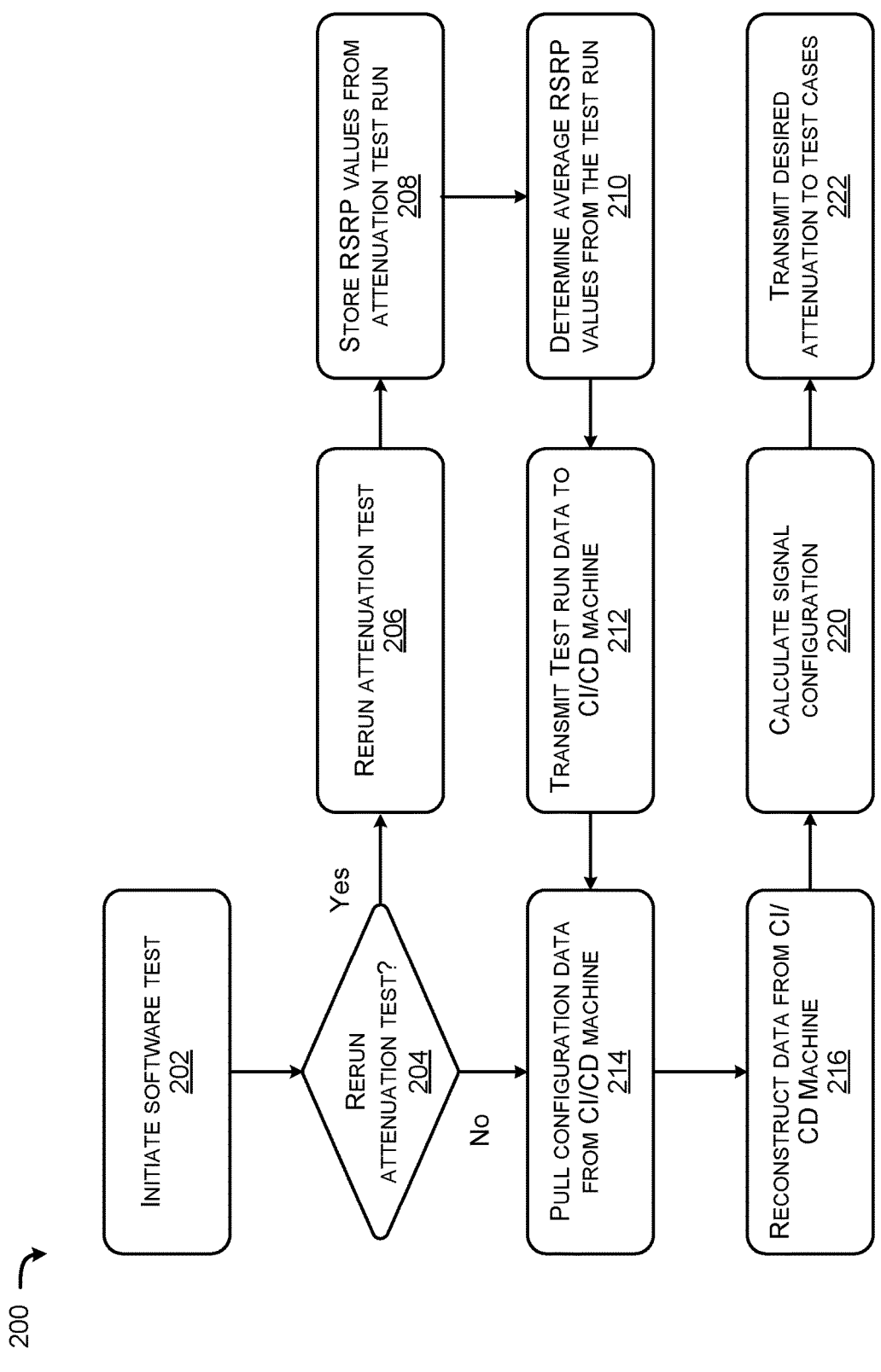
FIG. 2 illustrates an example process for determining a desired attenuation level.

FIGS. 2 and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 2 illustrates an example process 200 for determining a desired attenuation level. In particular, a system (such as the system illustrated in FIG. 1) can be used to determine calibration data for testing UEs. An operation 202 can include initiating a software test. As an initial matter, the process 200 can include an operation 204 to determine whether to rerun an attenuation test.

In some examples, a test can be defined by an engineer and can include any operations associated with signals to one or more UEs. By way of example, and without limitation, the testing plan may include establishing a 5G connection with a UE in an environment that includes 4G and 5G signals, and then decreasing the signal strength of the 5G signal until the UE performs a handover to a 4G signal. In such an example, the testing plan may specify the types of 4G and/or 5G signals and the expected RSRP values to be experienced by the UEs at specific periods of time. Accordingly, given a testing plan, the calibration data (as discussed herein) can map the expected RSRP values to control switches in the RF enclosure to select discrete attenuators at particular times to present particular signals at various power levels to the UE for testing. Of course, a testing plan can include any number of radio access technologies (e.g., 3G, 4G, 5G, Wi-Fi, Bluetooth, NFC, etc.), RSRP values, time sequences (e.g., controlling specific signal strength(s) at particular times), and the like.

In some examples, the operation 204 can include determining if a period of time has elapsed, if a configuration of attenuators and/or UEs has changed, if a testing plan has changed, and/or the like. If the test (e.g., to determine calibration data) should be rerun (yes: operation 204), the process can continuation to operation 206 which can include rerunning the attenuation test. At operation 208 any resulting RSRP values are stored, and then at operations 210 the operation can include determining average RSRP values. These average values can then be transmitted (in operation 212) to a continuous integration and continuous delivery (CI/CD) machine 212. At operation 214, the process can include retrieving configuration from the CI/CD machine, and reconstructed in the operation 216. These data are then used to calculate signal configuration information in operation 220, and/or the desired attenuation. Finally, the desired attenuation is transmitted to test cases in the operation 222.

In some examples, the CI/CD machine is a part of the memory component 319 of the computing device 300, and can store data files related to testing, such as attenuation data and previous UE and attenuator configurations. Additional examples of determining calibration data are discussed in connection with FIGS. 4A and 4B, as well as throughout this disclosure.

Figure 3:
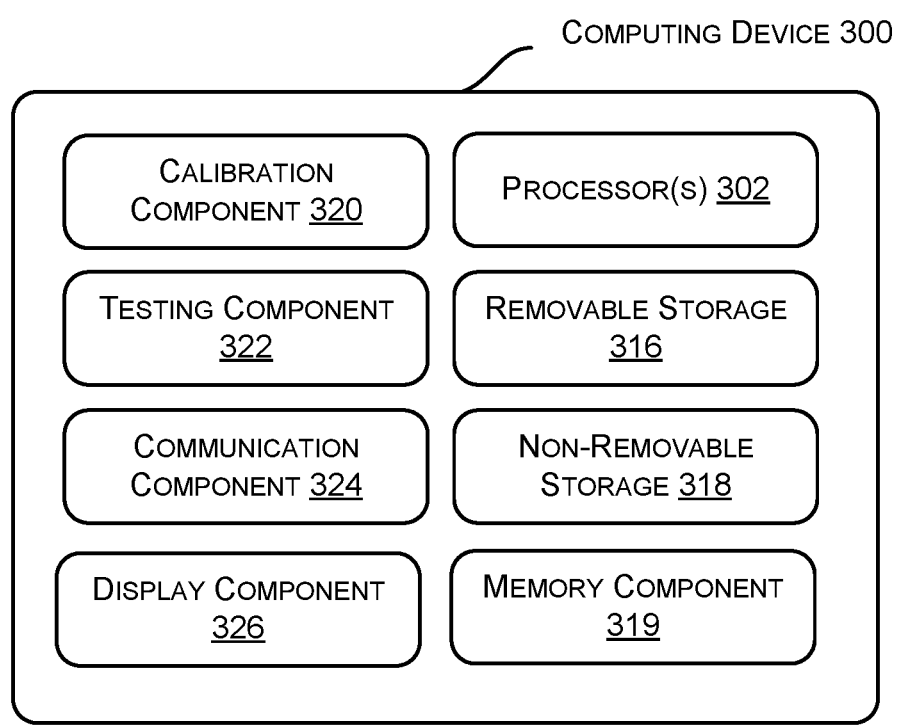
FIG. 3 illustrates a block diagram of a computing device implementing the techniques discussed herein.

FIG. 3 illustrates a block diagram of a computing device 300 implementing the techniques discussed herein, and shows only basic, high-level components of computing device 300. In various examples, the computing device 300 may include processor(s) 302, removable and non-removable storages 316 and 318, a memory component 319, a calibration component 320, a testing component 322, a communication component 324, and a display component 326.

In some examples, there may be multiple computing devices, such that a computing device sending the input signal may not necessarily be the same device that receives the measured RSRP data 132.

In some examples, the calibration component 320 can include functionality to evaluate, calculate, or otherwise determine different average RSRP measurements associated with one or more attenuators and/or UEs, as discussed herein. In some examples, the calibration component 320 can determine to prevent the inclusion of RSRP values below a predetermined threshold, as well as exclude certain RSRP values (e.g., outlier values deviating from an average beyond a threshold value) not included in average calculations.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores.

The processor(s) 302 is configured to retrieve and execute instructions from the memory 319.

In some examples, the processor(s) 302 may be combined with or may be communicatively coupled with the testing component 104. In some examples, testing component 104 can halt, initiate, or otherwise manage the functions of the calibration component 106 and the communication component 108. The exact functions of the testing component may vary depending on the degree of automation of the test selected. For example, users may be provided with the ability to select various bands and various RSRP values they want to see in their test scenarios, as well as the timing of signals. From there, the computing device 102 may attenuate to those bands and match the RSRP values the user inputted with their corresponding attenuation values.

The memory component 319 can also be described as non-transitory computer-readable media or machine-readable storage memory, and may include removable and non-removable media implemented in any method or technology for storage of information, such as computer executable instructions, data structures, program modules, or other data.

The memory component 319 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The computing device 300 may also include additional data storage devices (removable and/or non-removable) such as, for example, magnetic disks, optical disks, or tape. Such additional storage is illustrated in FIG. 3 by removable storage 316 and non-removable storage 318. Tangible computer-readable media can include volatile and non-volatile, removable and non-removable media implemented in any method or technology for storage of information, such as computer readable instructions, data structures, program modules, or other data. The memory 319, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the computing device 300. Any such tangible computer-readable media can be part of the computer device 300.

The memory component 319, the removable storage 316, and/or the non-removable storage 318 may in some cases include storage media used to transfer or distribute instructions, applications, and/or data. In some cases, the memory 319, the removable storage 316, and/or the non-removable storage 318 may include data storage that is accessed remotely, such as network-attached storage that the computing device 300 accesses over some type of data communications network.

In various examples, one or all of the memory component 319, the removable storage 316, and/or the non-removable storage 318 may store programming instructions that, when executed, implement some or all of the function functionality described herein. For example, there may be stored instructions specifying a test plan selecting at least one frequency band and its associated expected RSRP value, to be executed upon selection. The computing device 300 also can include display component 326, such as a touch-sensitive or non-touch-sensitive display allowing users to observe measured RSRP values in real time. These devices are well known in the art and need not be discussed at length here.

In some examples, the communication component 108 can include functionality to send an input signal to the attenuators 112, 114, 116, and/or 118 contained within the RF enclosure 110, as well as receive measured RSRP data 132. In some examples, communications may be sent or received through specific input or output devices making up the communication component 324, but may also be transmitted through various transceivers, which may comprise any sort of wireless transceivers capable of engaging in wireless, RF communication.

By way of example and without limitation, the calibration component 320 can measure, evaluate, calculate, or otherwise determine various RSRP values associated with the selected attenuation level. In some examples, the calibration component 320 can correspond to the calibration component 106, and can determine to prevent the inclusion of RSRP values below a pre-determined threshold (e.g., −130 dB, or some lower threshold limit), as well as exclude certain RSRP values not included in average calculations (e.g., RSRP values that deviate from an average beyond a threshold value).

In some examples, various components in FIG. 3 may be combined, or exist independently in multiple computing devices used to carry out the techniques illustrated in FIG. 1.

Figure 4A:
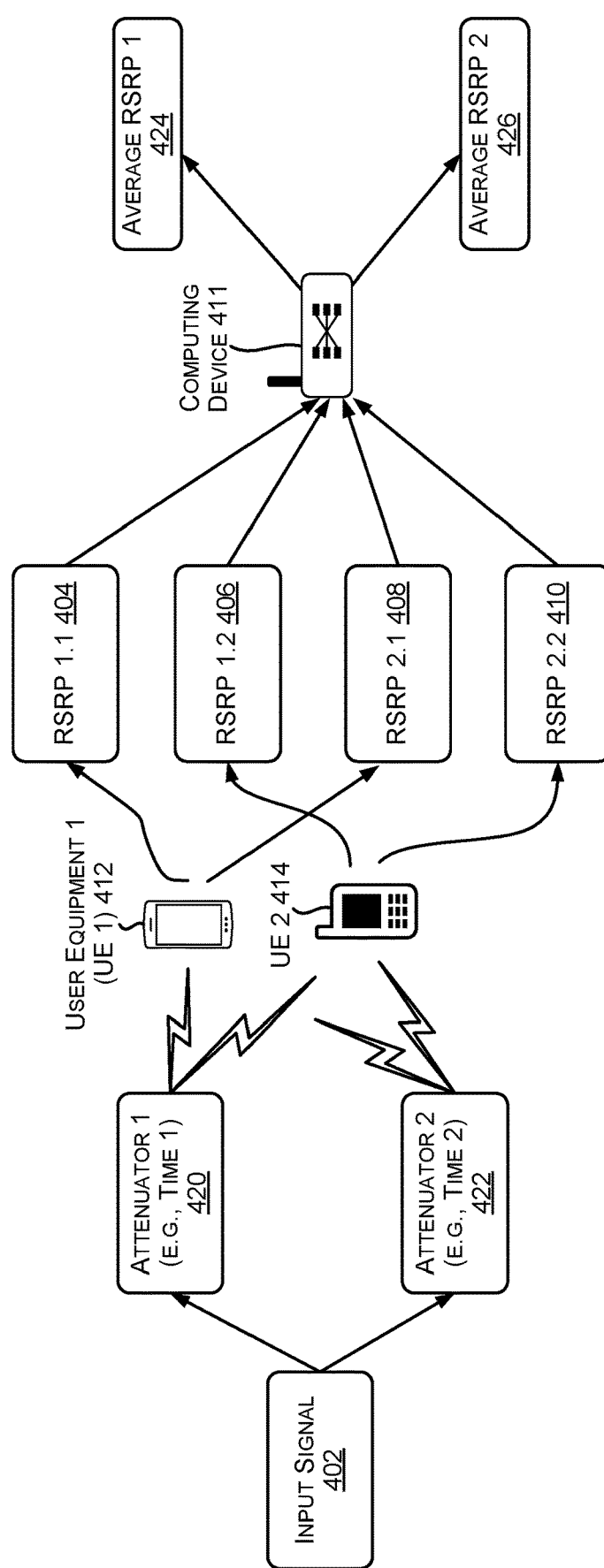
FIG. 4A illustrates an example for techniques for calculating average RSRP values for later steps in an attenuation range based on average RSRP values derived from the initial steps.
Figure 4B:
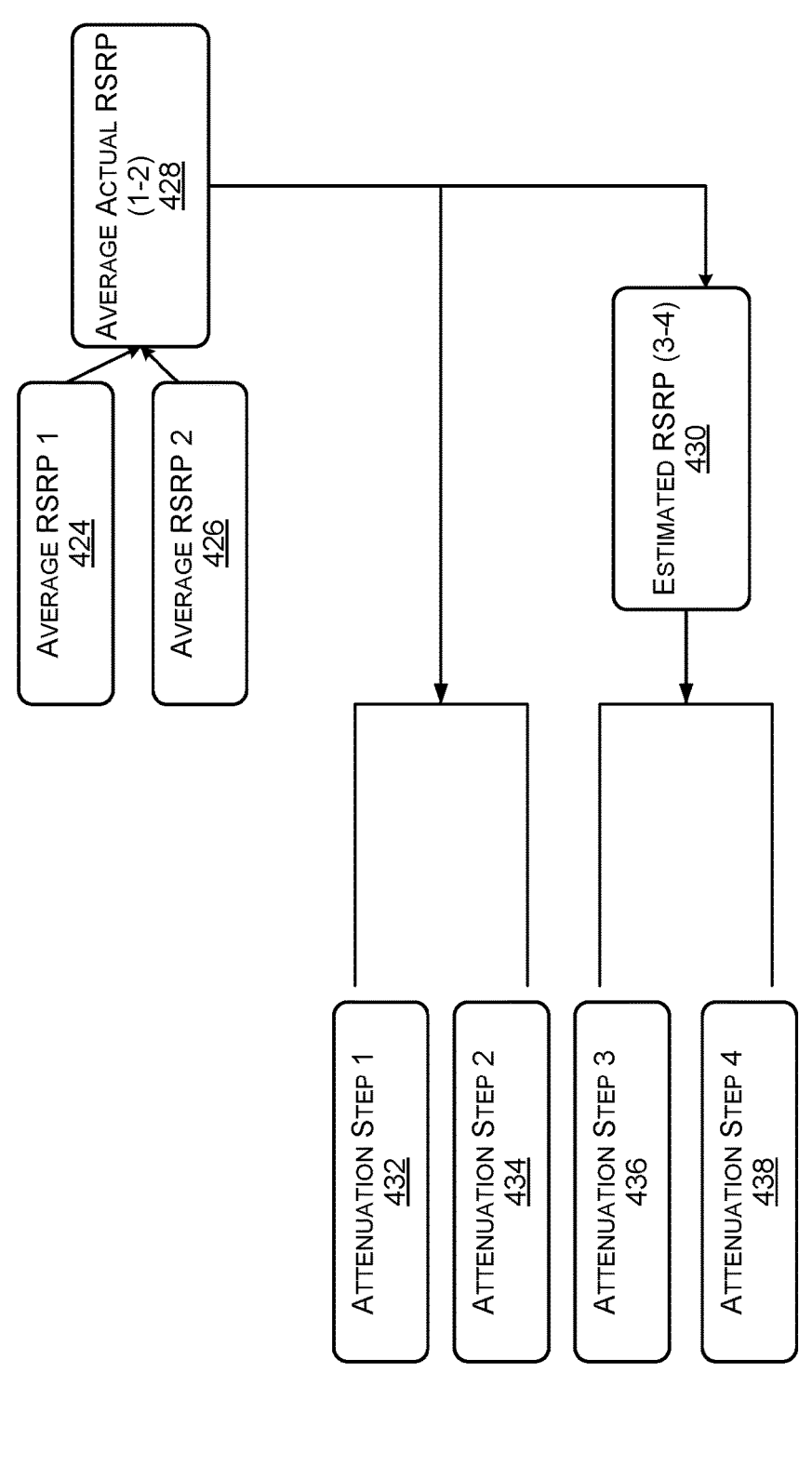
FIG. 4B illustrates additional aspects of the techniques shown in FIG. 4A, wherein average RSRP values for steps of an attenuation level can be extrapolated or otherwise determined.

FIGS. 4A and 4B illustrate examples for determining calibration data as discussed herein. In some examples, and in general, FIG. 4A can include techniques for determining or otherwise calculating RSRP values (e.g., average RSRP values) for later steps in an attenuation range based on RSRP values (e.g., average RSRP values) derived from the initial steps, while FIG. 4B can illustrate additional aspects of the techniques shown in FIG. 4A, wherein average RSRP values for steps of an attenuation level can be extrapolated or otherwise determined.

In some examples, an input signal 402 is passed through an attenuator 420 at a first time and through an attenuator 422 at a second time. The UEs 412 and 414 can receive the respective signals when transmitted via the attenuators 420 and 422 and can measure the actual measured RSRP values. For example, at time 1, the attenuator 1 420 can output a signal to the UEs 412 and 414, which can measure the signal and can determine measured RSRP values 404 and 406. As can be understood, the RSRP 404 includes the designation "1.1" where the first digit refers to the attenuator used to attenuate the signal, and the second digit refers to the UE measuring the RSRP value.

At time 2, the input signal is attenuated by the attenuator 2 422. The UEs 412 and 414 can measure the RSRP values and can output RSRP values 408 and 410, respectively. Continuing with the notation addressed above, the "RSRP 2.1" refers to an RSRP value resulting from the second attenuator 244 (e.g., at time 2) measured by UE 1 (e.g., UE 412).

Measured RSRP values 404, 406, 408, and 410 may then be received by a computing device 411, and may then be used by one or more components of computing device 411 to calculate average RSRP values 424 and 426 associated with each attenuator 420 and 422.

In some examples, the calculations done by the computing device 411 may be carried out by the calibration component 320, and may be displayed on the display component 326.

In some examples, average RSRP values may be calculated by including only those measurements within a pre-determined range from a median value and excluding those values outside the pre-determined range. For example, and with reference to FIG. 4B, the pre-determined range may, in some cases, be ±5 dB (or any other value) from the median value of the RSRP values measured in each attenuation step, such that, assuming a median of −65 dB, values outside of a −70 dB to −60 dB range would not be included in calculations to find one or more average RSRP values 424 and 426, depending on the number of attenuation steps selected. In some examples, this range may be extended to ±10 dB from the median value of the RSRP values measured in each attenuation step, to allow for a more accurate average actual RSRP value 428. Furthermore, in some cases, measured RSRP values may be displayed in real time, on a UE 412 and/or 414 or a connected computing device 411. These values, and any testing configurations of devices, attenuators, and attenuation levels may be output in order to identify if testing should be rerun.

Transmission of RSRP values may be done through cloud-based web and mobile app testing programs, including Android Debug Bridge (adb) tools and other wireless applications such as Perfecto. In some examples, data saved from testing, including measured RSRP values, may be stored on Continuous Integration Continuous Delivery (CI/CD) machines or in the test software itself. In some examples, the test software interface itself may allow direct communication with the UE, such that RSRP values may be received from applications installed on the UE.

The actual strength of input signal 402 may be unknown, so in some examples, it may be assumed that input signal strength remains constant across all cases within a single test. In some examples, the strength of the input signal 402 may change over a period of time after being influenced by differences in testing plans, changes in testing apparatuses, and the like.

FIG. 4B illustrates the continuation of the example techniques shown in FIG. 4A, in the form of the extrapolation of estimated RSRP values 430 from average actual RSRP values 428. In some examples, the average RSRP values 424 and 426 for the first few attenuation steps 432 and 434 in a selected attenuation level may be used to calculate an average actual RSRP value that is meant to match an estimated RSRP value 430 for the later attenuation steps 436 and 438.

For example, the average actual attenuation between attenuation steps 432 and 434 can be determined as discussed above. Rather than measure the attenuation levels for each attenuation step associated with the RF enclosure 110, an average attenuation step can be determined and then extrapolated to other unmeasured attenuation steps. Thus, the techniques can measure actual RSRP values to determined actual attenuation levels for some attenuation steps while extrapolating the attenuation to other unmeasured attenuation steps to expedite the determination of calibration data, therefore improving the accuracy of calibration data but also expediting the calibration process by using some statistical techniques to minimize the number of measurements needed to gain confidence about the calibration data.

By way of example, and without limitation, an additional example of determining calibration data is discussed as follows. In this example, an RF enclosure include five attenuators (e.g., A1, A2, A3, A4, and A5) and five UEs (UE1, UE2, UE3, UE4, and UE5). As introduced above, a measured RSRP value is designated by RSRP(J,K), where "J" refers to the attenuator used to attenuate the signal and "K" refers to the UE measuring the RSRP value. Using such a notation, RSRP(2,5) refers to the measured RSRP in response to a signal being attenuated by the second attenuator (A2) as measured by the fifth UE (UE5).

As can be understood, an input signal is input at a first time to A1 and RSRP values are measured as RSRP(1,1) . . . . RSRP(1,5). An input signal is input at a second time to A2 and RSRP values are measured as RSRP(2,1) . . . . RSRP (2,5). An input signal is input at a third time to A3 and RSRP values are measured as RSRP(3,1) . . . . RSRP(3,5)

First, an average RSRP value can be determined for RSPR values measured in response to the input signal being attenuated by A1. In this example, an average RSRP value can be determined based on RSRP(1,1) through RSRP(1,5). In some examples, an individual RSRP(1,1) may be an outlier RSRP value such that the RSRP(1,1) might deviate from the average beyond a predetermined threshold. In such as case, the RSRP(1,1) value may be omitted from the RSRP value and the average may be redetermined. The resulting RSRP average for A1 may be referred to as RSRP1_avg.

Next, an average RSRP value can be determined for RSRP values measured in response to the input signal being attenuated by A2 and A3. Outlier values may be omitted as discussed above. The resulting RSRP averages for A2 and A3 may be referred to as RSRP2_avg and RSRP3_avg.

Given the determined RSRP1_avg, RSRP2_avg, and RSRP3_avg values, the attenuation steps between attenuation levels can be determined. For example, the difference between RSRP1_avg and RSRP2_avg can be referred to as the RSRP_step_1-2. The difference between RSRP2_avg and RSRP3_avg can be referred to as the RSRP_step_2-3.

Given the determined attenuation between various levels, an average RSRP_step_avg can be determined (e.g., averaging RSRP_step_1-2 and RSRP_step_2-3). In some examples, an average RSRP_step_avg can be determined by sorting the RSRP values between steps and selecting the median value. Next, the determined RSRP_step_avg can be used to estimate the different expected attenuation levels for the unmeasured attenuation levels, A4 and A5. Accordingly, the techniques can balance accuracy and speed to determined calibration data, which can be used to convert testing plans to more accurate expected RSRP values for testing UEs. As can be understood, the example discussed above is not limiting and variations are contemplated within the scope of this disclosure.

FIG. 5 illustrates an example process for determining attenuation calibration data. The example process 500 can be performed by components of the computing device 300; notably testing component 322, calibration component 320, and/or communication component 324; and components contained within the RF enclosure 110, including attenuators 112, 114, 116, and/or 118, and UEs 124, 126, 128, and/or 130. In some examples, the display component 326 may display measured RSRP values in real-time during testing.

At operation 502, the input signal 402 is received by the communication component 324 of computing device 102. The input signal may be received comprising one of various frequency bands. In some examples, the input signal 402 may be sent on bands N66, N70, or any other frequency used by a signal carrier. In some examples, the signal carrier may be T-Mobile, Sprint, Verizon, or any other provider.

At operation 504, the input signal 402 is further sent to one of the attenuators 112, 114, 116, or 118 within RF enclosure 110. In some examples, each of the attenuators 112, 114, 116, or 118 may allow for up to 0 dB to 95 dB of attenuation (or any other level) to be imposed on the input signal 402, which can then be divided into attenuation steps.

At operation 506, the input signal 402 received by the computing device 102 and passed through one of the attenuators 112, 114, 116, and 118 may be received by one or more of UEs 124, 126, 128, or 130. In some examples, rather than starting with a novel configuration of devices and attenuators at specific attenuation levels, a user may instead choose to use data and configurations determined in a previous test, recalling them from one or more of memory component 319, removable storage 316, or non-removable storage 318.

At operation 508, the computing device 300 may check to see if the calibration was completed according to the desired configuration of the test. For example, if the test configuration of attenuators, RF enclosures, and UEs during a particular test run was intended to include running attenuation through the three attenuators 112, 114, and 116, operations 504, 506, and 508 will be repeated for each attenuator, ensuring that signal strength is analyzed at each of their attenuation levels, and that all desired combinations of attenuators, UEs, and RF enclosures may be tested in a streamlined manner, according to a single unified process. Only after completion of all required loops will operation 508 conclude, allowing example process 500 to continue to operation 510.

In some examples, determination of the completion of calibration may be variously conducted by the processor(s) 302, the calibration component 320, and the testing component, 322, depending on the exact structure and arrangement of the one or more computing devices.

At operation 510, an average actual RSRP (e.g., the RSRP 428) can be calculated based on RSRP values measured during operation 506. In some examples, average RSRP values 424 and 426 associated with earlier attenuation steps 432 and 434 can be used to extrapolate estimated RSRP values 430 associated with later steps 436 and 438 by finding an average actual RSRP value 428 used as a standard value for each step, removing the need to engage in further calculations. In some examples, the average RSRP values 424 and 426 associated with each individual step in a selected attenuation level may be found by including only those values within a certain range of a pre-determined median RSRP value, with values outside of the range of the pre-determined median RSRP value being discarded.

If the measured RSRP values received by the computing device fall below a certain threshold, further measurements will be halted. For example, if a measured RSRP value falls below −130 dB, further calculations may be halted, and an average RSRP value may be calculated from only the existing measurements.

In some examples, the one or more of UEs 124, 126, 128, or 130 which received the input signal 402 transmit measured RSRP data 132 to computing device 300 via an interface (e.g., an Android debug bridge), or a different application installed on the UE. In some examples, this may be done live, enabling real-time analysis of RSRP data.

At operation 512, the average actual RSRP value 428 found is then compared to an expected RSRP value for the attenuation level selected. The expected RSRP value is a value from a measurement taken prior to the initiation of example process 500. Comparisons between the expected RSRP value and the average actual RSRP value 428 can be completed through an evaluation of the numerical difference between the two values.

At operation 514, calibration data for the RF enclosure selected is determined based at least in part on the difference between the actual and expected RSRP values. Any resulting differences may be used to adjust input signal strength in future. For example, an average actual RSRP value 428 that is associated with a weaker signal strength than that of the signal strength associated with an expected RSRP value for that attenuation level may indicate that the signal strength of the input signal 402 needs to be increased in future tests, as well as in practical field applications. Accordingly, example process 500 ultimately allows for optimization of signal strength in field and test environments, allowing for both greater testing accuracy and improved user experience.

CONCLUSION

Although features and/or methodological acts associated with the claims are described above, it is to be understood that the appended claims are not necessarily limited to the inclusion of those features or the execution of those acts. Rather, the features and acts described above are disclosed merely as example forms of implementing the claims.

What is claimed is:

1. A method comprising:
receiving an input signal;
sending the input signal to a first attenuator associated with a radio frequency (RF) enclosure, wherein the first attenuator is associated with a first attenuation level;
receiving a first signal from a plurality of user equipments (UEs) within the RF enclosure, wherein the first signal is indicative of a first Reference Signal Receive Power (RSRP) measured by the plurality of UEs in response to the input signal attenuated by the first attenuator;
sending the input signal to a second attenuator associated with the RF enclosure, wherein the second attenuator is associated with a second attenuation level;
receiving a second signal from the plurality of UEs within the RF enclosure, wherein the second signal is indicative of second RSRP measured by the plurality of UEs in response to the input signal attenuated by the second attenuator;
determining, based at least in part on the first RSRP and the second RSRP, an actual RSRP associated with an attenuation step;
determining a difference between the actual RSRP associated with the attenuation step and an expected RSRP; and
determining RF enclosure calibration data based at least in part on the difference between the actual RSRP and the expected RSRP.

2. The method of claim 1, further comprising:
receiving a test plan including at least one RF band and an expected dB value;
mapping the expected dB value to a discrete attenuation level; and
running the test plan.

3. The method of claim 2, further comprising:
determining that measured RSRP is less than a threshold; and
stopping the test plan run based on the RSRP being less than the threshold.

4. The method of claim 2, wherein the test plan comprises at least one of:
a static call;
a handover;
a speed test; or
a speed test with a handover.

5. The method of claim 1, wherein the input signal is a Fourth-Generation Long Term Evolution signal.

6. The method of claim 1, wherein the input signal is a Fifth-Generation New Radio signal.

7. The method of claim 1, wherein the first RSRP is received from an application installed on individual UEs of the plurality of UEs.

8. The method of claim 1, further comprising:
determining a frequency band; and
determining the RF enclosure calibration data for the frequency band.

9. The method of claim 1, wherein determining the actual RSRP further comprises removing outlier data values.

10. The method of claim 1, further comprising:
determining an average step size in an attenuation range;
determining a first actual RSRP for a first step in the attenuation range;
determining a second actual RSRP for a second step in the attenuation range; and
extrapolating expected RSRP values for unmeasured steps in the attenuation range, based at least in part on the first actual RSRP and the second actual RSRP.

11. A system comprising:
one or more processors; and
one or more non-transitory computer readable media storing computer executable instructions that, when executed, cause the one or more processors to perform operations comprising:
receiving an input signal;
sending the input signal to a first attenuator associated with a Radio Frequency (RF) enclosure, wherein the first attenuator is associated with a first attenuation level;
receiving a first signal from a plurality of user equipments (UEs) within the RF enclosure, wherein the first signal is indicative of a first Reference Signal Receive Power (RSRP) measured by the plurality of UEs in response to the input signal attenuated by the first attenuator;
sending the input signal to a second attenuator associated with the RF enclosure, wherein the second attenuator is associated with a second attenuation level;
receiving a second signal from the plurality of UEs within the RF enclosure, wherein the second signal is indicative of second RSRP measured by the plurality of UEs in response to the input signal attenuated by the second attenuator;
determining, based at least in part on the first RSRP and the second RSRP, an actual RSRP associated with an attenuation step;
determining a difference between the actual RSRP associated with the attenuation step and an expected RSRP; and
determining RF enclosure calibration data based at least in part on the difference between the actual RSRP and the expected RSRP.

12. The system of claim 11, wherein the first attenuator is a first discrete attenuation level and the second attenuator is a second discrete attenuation level that is different than the first attenuation level.

13. The system of claim 11, wherein the input signal comprises at least one of a Fourth-Generation signal or a Fifth-Generation signal.

14. The system of claim 11, wherein the first RSRP is received from an application installed on individual UEs of the plurality of UEs.

15. The system of claim 11, the operations further comprising:
determining that measured RSRP is less than a threshold; and
stopping a test plan run based on the RSRP being less than the threshold.

16. One or more non-transitory computer readable media storing computer executable instructions that, when executed, cause one or more processors to perform operations comprising:
receiving an input signal;
sending the input signal to a first attenuator associated with a radio frequency (RF) enclosure, wherein the first attenuator is associated with a first attenuation level;
receiving a first signal from a plurality of user equipments (UEs) within the RF enclosure, wherein the first signal is indicative of a first Reference Signal Receive Power (RSRP) measured by the plurality of UEs in response to the input signal attenuated by the first attenuator;
sending the input signal to a second attenuator associated with the RF enclosure, wherein the second attenuator is associated with a second attenuation level;
receiving a second signal from the plurality of UEs within the RF enclosure, wherein the second signal is indicative of second RSRP measured by the plurality of UEs in response to the input signal attenuated by the second attenuator;
determining, based at least in part on the first RSRP and the second RSRP, an actual RSRP associated with an attenuation step;
determining a difference between the actual RSRP associated with the attenuation step and an expected RSRP; and
determining RF enclosure calibration data based at least in part on the difference between the actual RSRP and the expected RSRP.

17. The one or more non-transitory computer readable media of claim 16, wherein the input signal comprises at least one of a Fourth-Generation signal or a Fifth-Generation signal.

18. The one or more non-transitory computer readable media of claim 16, wherein the first attenuator is a first discrete attenuation level and the second attenuator is a second discrete attenuation level that is different than the first attenuation level.

19. The one or more non-transitory computer readable media of claim 16, wherein the first RSRP is received from an application installed on individual UEs of the plurality of UEs.

20. The one or more non-transitory computer readable media of claim 16, the operations further comprising:
determining that measured RSRP is less than a threshold; and
stopping a test plan run based on the RSRP being less than the threshold.

* * * * *